United States Patent
Wilenski et al.

(10) Patent No.: US 10,843,452 B2
(45) Date of Patent: Nov. 24, 2020

(54) SYSTEMS AND METHODS FOR CURE CONTROL OF ADDITIVE MANUFACTURING

(71) Applicant: The Boeing Company, Chicago, IL (US)

(72) Inventors: Mark Stewart Wilenski, Mercer Island, WA (US); Michael Patrick Kozar, Mercer Island, WA (US); Nick Shadbeh Evans, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 624 days.

(21) Appl. No.: 15/367,021

(22) Filed: Dec. 1, 2016

(65) Prior Publication Data

US 2018/0154588 A1 Jun. 7, 2018

(51) Int. Cl.
*B33Y 50/00* (2015.01)
*B33Y 10/00* (2015.01)
(Continued)

(52) U.S. Cl.
CPC .......... *B33Y 50/02* (2014.12); *B29C 35/0266* (2013.01); *B29C 64/106* (2017.08);
(Continued)

(58) Field of Classification Search
CPC ..... B29C 64/135; B29C 64/20; B29C 64/386; B29C 35/0266; B29C 64/209; B33Y 10/00; B33Y 50/02
See application file for complete search history.

(56) References Cited

U.S. PATENT DOCUMENTS 3,600,272 A   8/1971   Cortigene et al.
3,813,976 A   6/1974   Greer
(Continued)

FOREIGN PATENT DOCUMENTS

CN   103817937   5/2014
DE   201310103973   10/2014
(Continued)

OTHER PUBLICATIONS

Machine generated English translation of abstract for DE 201310103973 downloaded from Espacenet.com on Nov. 1, 2017.
(Continued)

*Primary Examiner* — Nahida Sultana
*Assistant Examiner* — Debjani Roy
(74) *Attorney, Agent, or Firm* — DASCENZO GATES Intellectual Property Law, P.C.

(57) ABSTRACT

Systems for cure control of additive manufacturing comprise a build volume, a curing energy source, and a controller. The curing energy source is configured to actively deliver curing energy to discrete sections of a part as it is being additively manufactured. The controller is programmed to direct delivery of curing energy to impart desired cure properties to the discrete sections and/or according to predetermined cure profiles for the discrete sections. Methods of additively manufacturing a part comprise additively building a part from a feedstock material, and actively curing discrete sections of the part as it is being additively built to impart desired cure properties to the part and/or desired cure profiles to the part.

21 Claims, 2 Drawing Sheets

(51) Int. Cl.
  *B33Y 30/00* (2015.01)
  *B29C 64/106* (2017.01)
  *B33Y 50/02* (2015.01)
  *B29C 35/02* (2006.01)
  *B29C 64/135* (2017.01)
  *B29C 64/209* (2017.01)
  *B29K 105/00* (2006.01)

(52) U.S. Cl.
  CPC .......... *B29C 64/135* (2017.08); *B29C 64/209* (2017.08); *B33Y 10/00* (2014.12); *B33Y 30/00* (2014.12); *B29K 2105/0002* (2013.01)

(56) References Cited

U.S. PATENT DOCUMENTS

| | | | |
|---|---|---|---|
| 4,154,634 A | 5/1979 | Shobert et al. | |
| 4,378,343 A | 3/1983 | Sugiura et al. | |
| 4,435,246 A | 3/1984 | Green | |
| 4,929,402 A * | 5/1990 | Hull | B29C 35/08 264/308 |
| 4,943,472 A | 7/1990 | Dyksterhouse et al. | |
| 5,134,569 A * | 7/1992 | Masters | B29C 64/118 700/182 |
| 5,204,124 A | 4/1993 | Secretan et al. | |
| 5,294,461 A | 3/1994 | Ishida | |
| 5,340,433 A | 8/1994 | Crump | |
| 5,398,193 A | 3/1995 | deAngelis | |
| 5,495,328 A | 2/1996 | Spence et al. | |
| 5,503,785 A * | 4/1996 | Crump | B29C 64/106 264/40.7 |
| 5,936,861 A | 8/1999 | Jang et al. | |
| 6,129,872 A | 10/2000 | Jang | |
| 6,149,856 A | 11/2000 | Zemel et al. | |
| 6,214,279 B1 | 4/2001 | Yang et al. | |
| 6,395,210 B1 | 5/2002 | Head et al. | |
| 6,495,091 B1 | 12/2002 | Manson et al. | |
| 6,537,052 B1 * | 3/2003 | Adler | B29C 64/135 425/174.4 |
| 6,722,872 B1 | 4/2004 | Swanson et al. | |
| 7,114,943 B1 | 10/2006 | Fong et al. | |
| 7,232,850 B2 | 6/2007 | Johnson et al. | |
| 7,521,105 B2 | 4/2009 | Bech et al. | |
| 8,133,537 B2 | 3/2012 | Nair et al. | |
| 8,801,990 B2 | 8/2014 | Mikulak et al. | |
| 8,920,697 B2 | 12/2014 | Mikulak et al. | |
| 9,149,989 B2 | 10/2015 | Uckelmann | |
| 2001/0048184 A1 | 12/2001 | Ueno | |
| 2003/0044593 A1 | 3/2003 | Vaidyanathan et al. | |
| 2004/0119188 A1 | 6/2004 | Lowe | |
| 2005/0023719 A1 * | 2/2005 | Nielsen | B29C 64/40 264/162 |
| 2005/0038222 A1 | 2/2005 | Joshi et al. | |
| 2005/0093208 A1 | 5/2005 | Boyd et al. | |
| 2005/0104241 A1 | 5/2005 | Kritchman et al. | |
| 2005/0116391 A1 | 6/2005 | Lindemann et al. | |
| 2005/0248065 A1 | 11/2005 | Owada | |
| 2006/0048881 A1 | 3/2006 | Evans et al. | |
| 2007/0029030 A1 | 2/2007 | McCowin | |
| 2008/0157437 A1 | 7/2008 | Nelson et al. | |
| 2008/0213419 A1 | 9/2008 | Skubic et al. | |
| 2008/0257879 A1 | 10/2008 | Huskamp | |
| 2008/0315462 A1 | 12/2008 | Batzinger et al. | |
| 2009/0095410 A1 | 4/2009 | Oldani | |
| 2009/0130449 A1 | 5/2009 | El-Siblani | |
| 2009/0314391 A1 | 12/2009 | Crump et al. | |
| 2010/0024964 A1 | 2/2010 | Ingram, Jr. et al. | |
| 2010/0084087 A1 | 4/2010 | McCowin et al. | |
| 2010/0190005 A1 | 7/2010 | Nair et al. | |
| 2011/0147993 A1 | 6/2011 | Eshed et al. | |
| 2011/0195237 A1 * | 8/2011 | Patel | G03F 7/0037 428/195.1 |
| 2011/0300301 A1 | 12/2011 | Fernando et al. | |
| 2012/0267345 A1 | 10/2012 | Clark et al. | |
| 2014/0061974 A1 | 3/2014 | Tyler | |
| 2014/0086780 A1 | 3/2014 | Miller et al. | |
| 2014/0141166 A1 | 5/2014 | Rodgers | |
| 2014/0154347 A1 | 6/2014 | Dilworth et al. | |
| 2014/0232035 A1 * | 8/2014 | Bheda | B29C 64/106 264/148 |
| 2014/0263534 A1 | 9/2014 | Post et al. | |
| 2014/0265000 A1 | 9/2014 | Magnotta et al. | |
| 2014/0265040 A1 | 9/2014 | Batchelder | |
| 2014/0291886 A1 | 10/2014 | Mark et al. | |
| 2014/0328964 A1 | 11/2014 | Mark et al. | |
| 2014/0375794 A1 | 12/2014 | Singh | |
| 2015/0008422 A1 | 1/2015 | Lee et al. | |
| 2015/0037599 A1 | 2/2015 | Blackmore | |
| 2015/0044377 A1 | 2/2015 | Tibor et al. | |
| 2015/0048553 A1 | 2/2015 | Dietrich et al. | |
| 2015/0140230 A1 | 5/2015 | Jones et al. | |
| 2015/0165691 A1 * | 6/2015 | Mark | G05B 15/02 700/98 |
| 2015/0174824 A1 | 6/2015 | Gifford et al. | |
| 2015/0217517 A1 | 8/2015 | Karpas et al. | |
| 2015/0239046 A1 | 8/2015 | McMahan et al. | |
| 2015/0266243 A1 | 9/2015 | Mark et al. | |
| 2015/0291833 A1 | 10/2015 | Kunc et al. | |
| 2015/0314532 A1 | 11/2015 | Gordon | |
| 2016/0096326 A1 | 4/2016 | Naware | |
| 2016/0114532 A1 | 4/2016 | Schirtzinger et al. | |
| 2016/0120040 A1 * | 4/2016 | Elmieh | B33Y 80/00 427/97.3 |
| 2016/0136897 A1 | 5/2016 | Nielsen-Cole et al. | |
| 2016/0159009 A1 | 6/2016 | Canale | |
| 2016/0207259 A1 | 7/2016 | Fruth | |
| 2016/0230283 A1 | 8/2016 | Tseliakhovich et al. | |
| 2016/0236299 A1 | 8/2016 | Oberhofer | |
| 2016/0271874 A1 | 9/2016 | Tsai et al. | |
| 2016/0303793 A1 | 10/2016 | Ermoshkin et al. | |
| 2016/0311165 A1 * | 10/2016 | Mark | B33Y 10/00 |
| 2016/0332363 A1 | 11/2016 | Moore et al. | |
| 2016/0375491 A1 | 12/2016 | Swaminathan et al. | |
| 2017/0014906 A1 | 1/2017 | Ng et al. | |
| 2017/0087767 A1 * | 3/2017 | Grewell | B33Y 10/00 |
| 2017/0129179 A1 * | 5/2017 | Mandel | B29C 64/236 |
| 2017/0129180 A1 | 5/2017 | Coates et al. | |
| 2017/0136545 A1 * | 5/2017 | Yoshimura | B29C 64/20 |
| 2017/0157845 A1 | 6/2017 | Bihari et al. | |
| 2017/0217020 A1 * | 8/2017 | Gardiner | B33Y 50/02 |
| 2017/0341307 A1 | 11/2017 | Vilajosana et al. | |
| 2018/0029296 A1 * | 2/2018 | Van Esbroeck | B33Y 10/00 |
| 2018/0117836 A1 | 5/2018 | Reese et al. | |
| 2018/0236714 A1 * | 8/2018 | Thelakkadan | B29C 64/371 |
| 2018/0361660 A1 * | 12/2018 | Chen | B29C 64/135 |

FOREIGN PATENT DOCUMENTS

| | | | |
|---|---|---|---|
| DE | 102015002967 | 10/2016 | |
| EP | 1151849 | 11/2001 | |
| EP | 1151849 A1 * | 11/2001 | B33Y 30/00 |
| EP | 2583773 | 4/2013 | |
| JP | H02130132 | 5/1990 | |
| JP | 2015174284 | 10/2015 | |
| WO | WO 01/81031 | 11/2001 | |
| WO | WO 2006/020685 | 2/2006 | |
| WO | WO 2008/013483 | 1/2008 | |
| WO | WO 2012/039956 | 3/2012 | |
| WO | WO 2013/086577 | 6/2013 | |
| WO | WO 2014/153535 | 9/2014 | |
| WO | WO 2014138386 | 9/2014 | |
| WO | WO 2015/009938 | 1/2015 | |
| WO | WO2015193819 | 12/2015 | |
| WO | WO 2016/053681 | 4/2016 | |
| WO | WO 2016053681 | 4/2016 | |
| WO | WO 2016125138 | 8/2016 | |
| WO | WO 2016139059 | 9/2016 | |
| WO | WO2016149181 | 9/2016 | |
| WO | WO-2016149181 A1 * | 9/2016 | B29C 70/70 |

OTHER PUBLICATIONS

U.S. Appl. No. 14/841,423, filed Aug. 31, 2015, Evans et al.

(56) References Cited

OTHER PUBLICATIONS

Ogale et al., "Fabrication of Fiber Reinforced Plates with Curvilinear Layout by 3-D Photolithography," 26th International SAMPE Technical Conference, vol. 26, pp. 54-61, Oct. 17-20, 1994.
Ogale et al., "3-Dimensional Composite Photolithography," Proceedings of the American Society for Composites, Eleventh Technical Conference, pp. 822-828, Oct. 7-9, 1996.
Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.
Gupta et al., "Dual Curing of Carbon Fiber Reinforced Photoresins for Rapid Prototyping," Polymer Composites, vol. 23, No. 6, pp. 1162-1170, Dec. 2002.
Hu et al., "Sensing, Modeling and Control for Laser-Based Additive Manufacturing," International Journal of Machine Tools and Manufacture, No. 43, pp. 51-60, 2003.
U.S. Appl. No. 14/841,470, filed Aug. 31, 2015, Evans et al.
U.S. Appl. No. 14/920,748, filed Oct. 22, 2015, Evans et al.
U.S. Appl. No. 14/931,573, filed Nov. 3, 2015, Evans et al.
Farshidianfar et al., "Real-Time Control of Microstructure in Laser Assitive Manufacturing," International Journal of Advanced Manufacturing Technology (2016), vol. 82, pp. 1173-1186, published online Jul. 1, 2015.
Website screenshots showing "Fiber Composite 3D Printing," from MakeZine.com website, downloaded on Jun. 2, 2015.
User Manual for 3Doodler 2.0, from The3Doodler.com website, downloaded on Aug. 19, 2015.
Printout of online article "Automated Fiber Placement," from AutomatedDynamics.com website, downloaded on Aug. 19, 2015.
Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, from ScienceDirect.com website, downloaded on Aug. 19, 2015.
Website screenshots showing the Mark One Composite 3D Printer, from MarkForged.com website, downloaded on Aug. 19, 2015.
U.S. Appl. No. 14/995,507, filed Jan. 14, 2016, Evans et al.
U.S. Appl. No. 15/063,400, filed Mar. 7, 2016, Evans et al.
U.S. Appl. No. 15/345,189, filed Nov. 7, 2016, Wilenski, et al.
Printout of online article "Carbon-Fiber Epoxy Honeycombs Mimic the Material Performance of Balsa Wood," Jun. 27, 2014, downloaded from redorbit.com/news/science/1113180114/carbon-fiber-epoxy-honeycombs-mimic-the-material-performance-of-balsa-wood/, Aug. 19, 2015.
Website screenshots showing online article, Krassenstein "Orbital Composites to Make 3D Printing 100 Times Faster Using Carbon Fiber, Fiber Optics, Injection & More," Apr. 28, 2015, from 3DPrint.com website, downloaded on Aug. 19, 2015.
Printout of online article "Carbon3D Introduces Breakthrough CLIP Technology for Layerless 3D Printing, 25-100x Faster," Mar. 17, 2015, from 3Ders.org website, downloaded on Aug. 19, 2015.
Website screenshots showing the Form 1+ SLA 3D Printer, from FormLabs.com website, downloaded on Aug. 20, 2015.
Printout of website showing FormLabs, Frequently Asked Questions (re the Form1+ SLA 3D Printer), from FormLabs.com website, downloaded on Aug. 19, 2015.
U.S. Appl. No. 15/346,537, filed Nov. 8, 2016, Wilenski et al.
U.S. Appl. No. 15/356,420, filed Nov. 18, 2016, Wilenski et al.
Website screenshots of online how-to article, "Fiber Composite 3D Printing (The Bug)," from Instructables.com website, downloaded on Aug. 20, 2015.
Website screenshots of online article, Evan Milberg, "Arevo Labs Introduces First Robot-Based Platform for 3-D Printing Composite Parts," Nov. 23, 2015, from CompositesManufacturingMagazine.com website, downloaded on Jan. 12, 2016.
Printout of online article, Jeff Sloan, "Arevo Labs launches 3D printing platform for composite parts fabrication," Nov. 16, 2015, from CompositesWorld.com website, downloaded on Dec. 9, 2015.
Printout of online article, "Improving Additive Manufacturing (3D Printing) using Infrared Imaging," Aug. 10, 2016, from AZoM.com website, downloaded on Nov. 4, 2016.
Website screenshots showing Stratonics ThermaViz® Sensor Systems, from Stratonics.com website, downloaded on Nov. 4, 2016.
Machine generated English translation of CN 103817937, dated Mar. 26, 2018.
Machine generated English translation of the abstract of JP2015174284, downloaded from Espacenet.com Jun. 12, 2018.
Machine generated English translation of the abstract of DE102015002967, downloaded from Espacenet.com Jun. 12, 2018.
European Patent Office, Extended European Search Report for related European Application No. 17198483, dated May 15, 2018.
Machine-generated English translation of JPH02130132, downloaded from Espacenet on Mar. 11, 2020.

\* cited by examiner

SYSTEMS AND METHODS FOR CURE CONTROL OF ADDITIVE MANUFACTURING

FIELD

The present disclosure relates to additive manufacturing.

BACKGROUND

Current additive manufacturing techniques that utilize curable feedstock materials, such as photopolymers, typically provide full curing of the material as it is being deposited by a nozzle, such as by directing a light source directly at the outlet of the nozzle. Such techniques may impact the quality of adhesion between adjacent layers of material, thereby creating parts that are prone to separation and peeling. Conversely, if too little cure of the material is provided, parts may be created that are prone to deformation and other undesirable properties.

SUMMARY

Disclosed systems for cure control of additive manufacturing comprise a build volume within which a part is additively manufactured, a curing energy source positioned relative to the build volume and configured to actively deliver curing energy to discrete sections of the part as the part is being additively manufactured, and a controller operatively coupled to the curing energy source and configured to direct delivery of curing energy from the curing energy source to discrete sections of the part as the part is being additively manufactured to impart desired cure properties to the discrete section and/or to follow predetermined cure profiles for the discrete sections.

Disclosed methods for additively manufacturing a part comprise additively building a part from a feedstock material, and actively curing discrete sections of the part as the part is being additively built to impart desired cure properties to the part and/or to follow predetermined cure profiles for the part.

DESCRIPTION

Systems and methods for cure control of additive manufacturing are disclosed herein. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
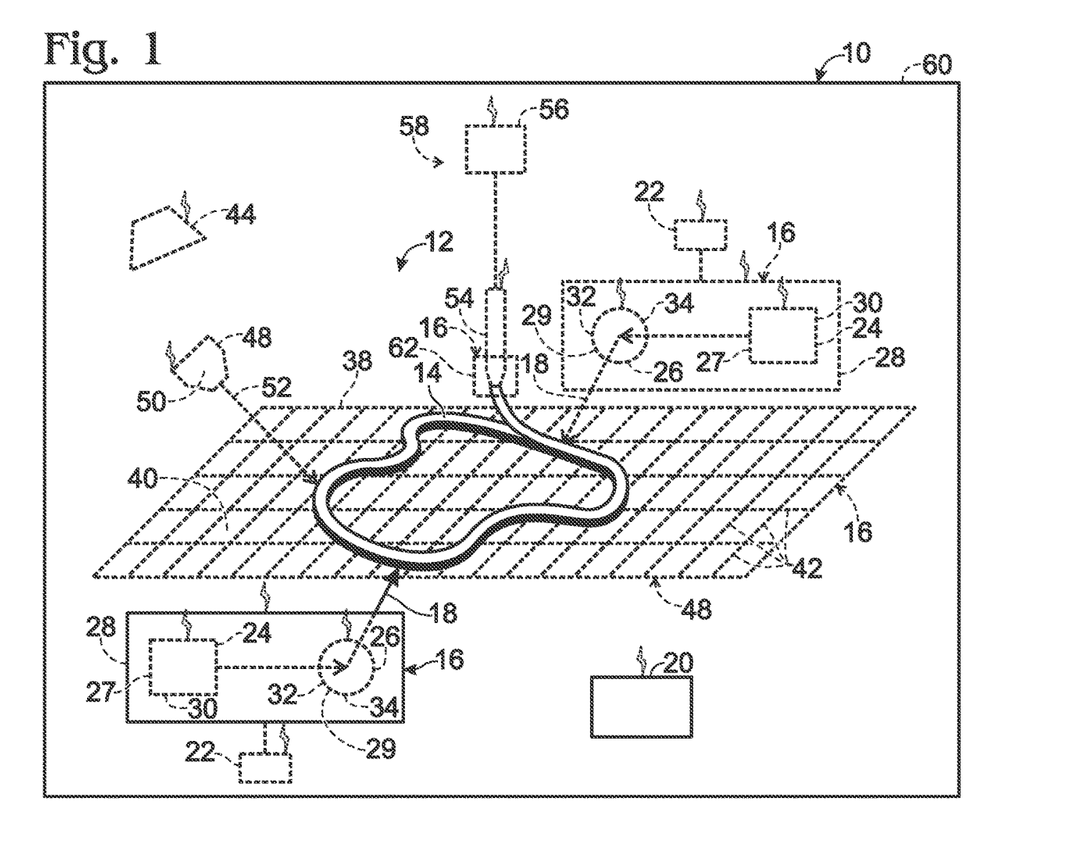
FIG. 1 is a schematic diagram representing systems for cure control of additive manufacturing.

With reference to FIG. 1, systems 10 for cure control of additive manufacturing comprise at least a build volume 12 within which a part 14 is additively manufactured, a curing energy source 16 positioned relative to the build volume 12 and configured to actively deliver curing energy 18 to discrete sections of the part 14 as the part 14 is being additively manufactured, and a controller 20 operatively coupled to the curing energy source 16 and configured to direct delivery of the curing energy 18 from the curing energy source 16 to discrete sections of the part 14 as the part 14 is being additively manufactured to impart desired cure properties to the discrete sections and/or to follow predetermined cure profiles for the discrete sections.

As used herein, "additive manufacturing" refers to the construction of a part from the bonding together of sub-elements thereof from a feedstock, in which the sub-elements become one to define the whole of the part. Additive manufacturing is distinguished from subtractive manufacturing (e.g., machining), in which material is removed from a volume of material to construct a part. Examples of additive manufacturing include (but are not limited to) three-dimensional (3D) printing technologies, such as extrusion deposition, lamination, photopolymerization, stereolithography, powder fed directed energy deposition, and continuous liquid interface production. Various feedstock materials have been used in additive manufacturing, and any suitable feedstock materials may be used in connection with systems 10, including, for example, feedstocks that include one or more of thermosets, and fiber reinforced composite materials, including materials that include fiber tows and/or chopped fiber. Systems 10 are not limited to additive manufacturing with composite materials and any suitable type of additive manufacturing may be used with any suitable feedstock material. "Additive manufacturing" additionally or alternatively may be described as "additive building," and similarly, "additively manufactured" additionally or alternatively may be described as "additively built."

Systems 10 comprise at least one curing energy source 16, but any suitable number of curing energy sources 16 may be utilized, with FIG. 1 schematically indicating four curing energy sources 16. Curing energy sources 16 may take any suitable form and configuration, such that they are configured to actively deliver curing energy 18 to discrete sections of a part 14 as it is being additively manufactured. By actively delivering curing energy 18 to discrete sections of a part 14, it is meant that the curing of discrete sections of the part 14 is controlled, as opposed to, for example, placement of the entire part 14 in an oven or autoclave, in which the entirety of the part 14 is subjected to the same heat and pressure. That is, the curing energy 18 is purposefully directed at discrete sections of a part 14 to impart desired cure properties to discrete sections of the part 14 and/or to follow predetermined cure profiles for discrete sections of the part 14. Stated differently, a curing energy source 16 is positioned and configured to direct curing energy 18 to a defined and specific subregion, or location, of a part 14 being additively manufactured, as opposed to an entirety of the part 14 or to a general region or zone of the part 14. Moreover, the discrete regions targeted with curing energy 18 need not be at a point of deposition of material, such as via an optional nozzle 54, and the curing energy 18 may be directed to any discrete region of the part 14 as it is being additively manufactured. Accordingly, discrete sections of the part 14 may be cured to different levels, or degrees, of cure, with different periodicity or frequency of exposure to curing energy 18, according to distinct cure profiles, and thus resulting in distinct cure properties. That is, at least two (but any number of) discrete sections may be purposefully cured according to different cure profiles and/or to create different cure properties. As illustrative, non-exclusive examples, the level of cure may be controlled by the duration and/or the intensity or strength of the curing energy 18 directed to a discrete section of the part 14, and thus by the dose of curing energy 18 received by a discrete section of the part 14. Additionally or alternatively, if different discrete sections of a part 14 are constructed of distinct materials, then different durations and/or intensities of the curing energy 18 may be required to impart desired cure properties to such discrete sections. Alternatively, distinct sections of a part 14 may be cured according to the same, or similar, desired cure profiles.

"Cure properties" as used herein may refer not only to levels or degrees of cure, but also to such physical properties as the hardness, strength, toughness, elasticity, and ductility that result from curing discrete sections of a part 14.

A desired "cure profile" of a discrete section of a part 14 relates to predetermined instructions that define boundaries and/or rates of influence or change of one or more parameters associated with the curing of the discrete section, with such parameters including one or more of (i) total dose (i.e., the accumulated exposure) of the curing energy 18 received by the discrete section (e.g., energy received per unit area), (ii) the rate of change of the dose (i.e., the dose rate, the dosage, the flux, or the irradiance) of the curing energy 18 received at the discrete section (e.g., power received per unit area), (iii) the temperature of the discrete section, (iv) the rate of temperate change of the discrete section, (v) the pressure of the environment at the discrete section, (vi) the rate of pressure change of the environment at the discrete section, and (vii) the ambient moisture of the environment at the discrete section. Cure profiles may be described as prescriptions or recipes for the curing of the discrete section or of a part 14 as a whole. In addition, such parameters may be based on and/or may be determined by such localized environmental factors as temperature, pressure, and ambient moisture. Additionally or alternatively, such parameters may be based on and/or may be determined by such part-specific properties as local part thickness, material of the part or discrete section thereof, etc. Cure profiles may define an aspect of a quality assurance or quality control program associated with the manufacture of parts 14. Accordingly, a part 14 may have a prescription or recipe that is predetermined to result in the part 14 meeting certain quality standards.

Figure 2:
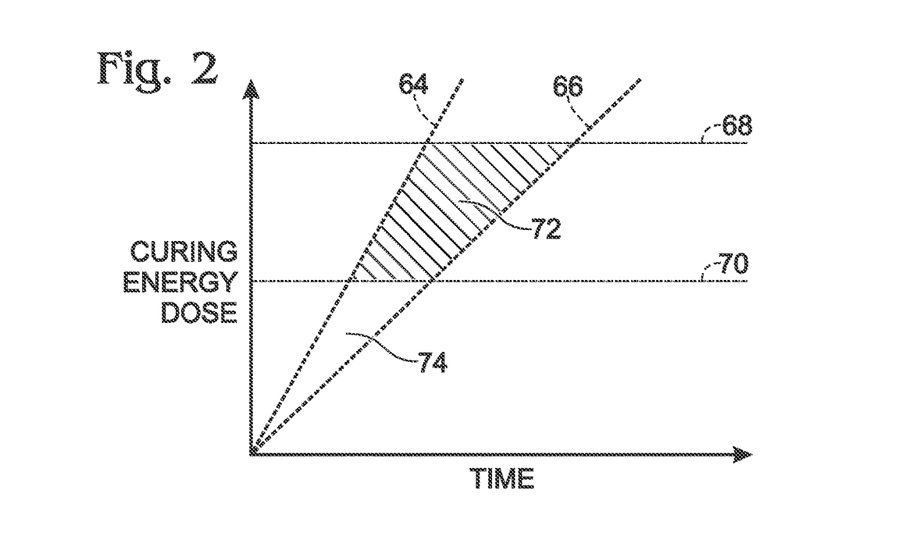
FIG. 2 is a chart schematically representing an example cure profile.

As an illustrative, non-exclusive example and with reference to FIG. 2, a cure profile of a discrete section of a part 14 may be bounded by a maximum dose rate 64 of curing energy 18 received, a minimum dose rate 66 of curing energy 18 received, a maximum dose 68 of curing energy 18 received, and a minimum dose 70 of curing energy 18 received. During the curing of a discrete section of a part 14, a corresponding cure profile is satisfied if the dose rate is at or between the maximum dose rate 64 and the minimum dose rate 66 and if the total dose is at or between the minimum dose 70 and the maximum dose 68. Thus to satisfy the example cure profile of FIG. 2, the dose must accumulate at a rate between maximum dose rate 64 and minimum dose rate 66 and the total dose must be between maximum dose 68 and minimum dose 70. If a dose rate lower than the minimum dose rate 66 or higher than maximum dose rate 64 were received by a distinct section of a part 14, then the cure profile would not satisfactorily be met, and the quality of the part 14 would not meet the desired characteristics. Similarly, if a total dose lower than minimum dose 70 or higher than maximum dose 68 were received by a distinct section of a part 14, then the cure profile would not satisfactorily be met, and the quality of the part 14 would not meet the desired characteristics.

Stated differently and with continued reference to FIG. 2, the region indicated at 74 bounds a desired initiation of application of curing energy 18, and the region indicated at 72 bounds a desired completion of application of curing energy 18, with the region 72 being bound by the predetermined parameters for the particular discrete section of the part 14 being cured.

Cure profiles may be selected (i.e., predetermined) to result in desired physical characteristics of a part 14. For example, by controlling one or more of the timing of the initiation of curing energy 18 directed to a discrete section, the duration of curing energy 18 directed to a discrete section, the dose of the curing energy 18 directed to a discrete section, and so forth, the timing of cure-induced shrinkage of the curable material may be controlled to control deformation, whether to avoid undesirable deformation or to purposefully introduce a desired deformation to the part 14. Additionally or alternatively, such parameters may be controlled to impart interference fits between adjacent sections of a part 14. Other physical properties also may be controlled.

The controller 20 facilitates the ability to impart different cure properties and to follow different cure profiles, for example, by controlling different durations of curing energy 18 and/or different intensities of curing energy 18 based on predetermined criteria to result in desired properties of a part 14.

Different cure properties may be desirable for various reasons. For example, the level of cure may be controlled to facilitate subsequent work on a part 14. Subsequent work additionally or alternatively may be referred to as post-print work. In some such examples, it may be desirable to mechanically work on a part 14 to remove material from the part 14 (e.g., via machining), and a less cured region may facilitate the removal of material from the less cured region. For example, in some applications, it may be desirable to imbed a distinct component in the part 14, such as one or more of a sensor, an electronic device, an actuator, a fastener, circuitry, wiring, tubing, fiber optics, a mechanical linkage, a sub-component, etc. Accordingly, a region of a part 14 may be purposefully formed to facilitate both the removal of material and the insertion of a distinct component.

Additionally or alternatively, in some applications, it may be desirable to form a region of the part 14 into a different shape than otherwise produced during the additive manufacturing process, such as to conform to an associated component to be operatively coupled to the part 14. That is, purposefully creating a region that is less cured, and thus for example softer, than adjacent regions may facilitate such subsequent mechanical working of the part 14.

Additionally or alternatively, a less cured region of a part 14 may facilitate the subsequent attachment of a distinct component to the less cured region. Moreover, in some such examples, the distinct component may be subsequently or simultaneously cured together with the less cured region of the part 14. That is, the less cured region and the distinct component may be co-cured, resulting in a monolithic structure, as opposed to being bonded together and being prone to separation and/or peeling, for example. Additionally or alternatively, a less cured region of a part 14 may facilitate subsequent surface preparation to the less cured region for the attachment of a distinct component to the less cured region. Additionally or alternatively, a less cured region of a part 14 may be adhered to a distinct component. Additionally or alternatively, a surface treatment may be applied to a less cured region of a part 14 to facilitate the subsequent attachment of a distinct component to the less cured region.

In some examples, the curing energy source 16 is configured to be able to deliver curing energy 18 to any exposed portion of the part 14 as the part 14 is being additively manufactured.

Some systems 10 further comprise a curing energy source drive assembly 22 that is configured to actively move the curing energy source 16 in three dimensions relative to the build volume 12. As illustrative, non-exclusive examples, an optional curing energy source drive assembly 22 may comprise or be one or more of a robotic arm and a drive assembly that facilitates movement of the curing energy source 16 in multiple degrees of freedom. In some examples, the curing energy source drive assembly 22 may be configured to move the curing energy source 16 orthogonally in three dimensions. In some examples, the curing energy source drive assembly 22 may be configured to move the curing energy source 16 in three dimensions with at least three degrees of freedom, with at least six degrees of freedom, with at least nine degrees of freedom, or with at least twelve degrees of freedom.

A curing energy source 16 may direct curing energy 18 of a single wavelength or may direct curing energy 18 of multiple wavelengths depending on a specific application, such as depending on a specific curable material utilized by a system 10. In some systems 10, the curing energy 18 may be described as incoherent energy. In other systems 10, the curing energy 18 may be described as coherent energy. In some systems 10, the curing energy 18 may comprise uncollimated light. In other systems 10, the curing energy 18 may comprise collimated light. Curing energy 18 may be delivered with current or voltage modulation, such as pulse width modulation, of the curing energy source 16.

In some examples, a curing energy source 16 comprises a laser 24, such as (but not limited to) an infrared laser or an ultraviolet laser configured to emit curing energy 18 in the form of a laser beam. In some such examples, the curing energy source 16 further comprises a mirror-positioning system 26 that is configured to actively direct a laser beam from the laser 24 to discrete sections of a part 14 as it is being additively manufactured. In some examples, both a curing energy source drive assembly 22 and a mirror-positioning system 26 may be provided, in which case the mirror-positioning system 26 may provide for better or more precise spatial control of the laser 24 than if solely a curing energy source drive assembly 22 were provided.

In some examples, a curing energy source 16 comprises an electron beam source 27, such as or comprising an electron gun and/or cathode ray tube, that is configured to emit curing energy 18 in the form of an electron beam. In some such examples, the curing energy source 16 further comprises a magnetic steering system 29 that is configured to actively direct an electron beam from the electron beam source 27 to discrete sections of a part 14 as it is being additively manufactured.

In some examples, a curing energy source 16 comprises a hot fluid supply 28, and the curing energy source 16 is configured to direct curing energy 18 in the form of a stream, or jet, of hot fluid (e.g., gas or liquid) to discrete sections of a part 14 as it is being additively manufactured.

In some examples, a curing energy source 16 comprises a lamp 30. As illustrative, non-exclusive examples, the lamp 30 may be an infrared lamp, an ultraviolet lamp, or a full-spectrum lamp; however, any suitable wavelength of lamp depending on the feedstock material may be used. In some such systems, the curing energy source 16 further comprises a projector 32 (e.g., a digital light processor (DLP) projector) that is associated with the lamp 30. In such examples, the projector 32 is configured to direct light from the lamp 30 to discrete sections of a part 14 as it is being additively manufactured. Additionally or alternatively, such a projector 32 may be configured to obscure light from the lamp 30 from sections of a part in which the light is not desired to be directed. Additionally or alternatively, the curing energy source 16 may further comprise a shuttering system 34 that is associated with the lamp 30, and with the shuttering system 34 configured to selectively direct light from the lamp 30 to discrete sections of a part 14 as it is being additively manufactured. Additionally or alternatively, the curing energy source 16 may be configured to selectively direct curing energy 18 to discrete sections of a part 14 with pulse width modulation (PWM), by modulating voltage of the curing energy source 16 (e.g., of a lamp 30), and/or by modulating current of the curing energy source 16 (e.g., of a laser 24).

Other examples of suitable curing energy sources 16 include (but are not limited to) those that are configured to deliver one or more of a plasma arc, a flame, and inductive heating. Additionally or alternatively, a curing energy source 16 may be configured to deliver curing energy 18 to discrete sections of a part 14 by selectively contacting discrete sections and conducting curing energy 18 (e.g., heat) to the discrete sections. In some such examples, a curing energy source 16 may comprise a probe and/or a clamp, such as that includes a resistive (or other type of) heater.

Some systems 10 further comprise a support bed 38 that is positioned relative to the build volume 12 and configured to support a part 14 as it is being additively manufactured. The support bed 38 has a support surface 40, which may take any suitable form or shape, including being planar or having contoured regions. Support bed 38 additionally or alternatively may be referred to as a mold or as having mold characteristics, such as by defining the contour of portions of a part 14 that are deposited, or otherwise formed, against the support surface 40.

In some examples, a curing energy source 16 comprises the support bed 38 and/or the support bed 38 comprises a curing energy source 16, with the support bed 38 being configured to actively deliver curing energy 18 to discrete sections of a lower surface of a part 14 as it is being additively manufactured. For example, in some such examples, the curing energy source 16 may further comprise a laser or other system, as discussed, for actively delivering curing energy 18 to discrete sections of a part 14 that are not physically engaged with the support surface 40 of a support bed 38, and the support bed 38 may actively direct curing energy 18 to such discrete sections of the part 14 that are physically engaged with the support surface 40.

Additionally or alternatively, in some examples in which a curing energy source 16 comprises a laser 24, a lamp 30, and/or an electron beam source 27, the support bed 38 may be transparent to the curing energy 18, and the curing energy source 16 (e.g., the laser 24, the lamp 30, and/or the electron beam source 27) may be configured to actively deliver curing energy 18 through the support bed 38 to discrete sections of a lower surface of a part 14 as it is being additively manufactured.

In yet further examples in which a curing energy source 16 comprises a lamp 30, the support bed 38 may be configured to actively mask a lower surface of a part 14 as it is being additively manufactured to actively direct light from the lamp 30 to discrete sections of the lower surface of the part 14 as it is being additively manufactured. For example, the support bed 38 may comprise a liquid crystal display (LCD).

Additionally or alternatively, in some examples, the support bed 38 comprises embedded heaters 42, for example, in the form of resistive heaters that are arranged in a two-dimensional array or grid, as schematically represented in FIG. 1. Accordingly, the heaters 42 may be selectively activated and deactivated to direct curing energy 18 in the form of heat at discrete sections of a lower surface of a part 14 as it is being additively manufactured.

As mentioned, predetermined cure profiles, and ultimately desired cure properties, may be based in part on such parameters as the temperature of a discrete section of the part 14. Accordingly, some systems 10 further comprise one or more thermal sensors 44 that are positioned relative to the build volume 12 and that are configured to acquire thermal data associated with a part 14 as it is being additively manufactured. FIG. 1 schematically and optionally illustrates one thermal sensor 44, but any suitable number of thermal sensors 44 may be provided, including more than one thermal sensor 44. When one or more thermal sensors 44 are included in a system 10, the controller 20 is operatively coupled to the thermal sensor(s) 44 and may be configured to direct delivery of curing energy 18 from a curing energy source 16 to discrete sections of a part 14 based at least in part on the thermal data. In other words, the active controlling of the delivery of curing energy 18 in such examples may be based on real-time thermal data acquired via the one or more thermal sensors 44.

Additionally or alternatively, in some systems 10, the controller 20 is configured to direct delivery of curing energy 18 from a curing energy source 16 to discrete sections of a part 14 based at least in part on predicted thermal characteristics of the part 14 as it is being additively manufactured. Examples of thermal characteristics include temperatures at discrete locations of the part 14, optionally surface temperatures and optionally internal temperatures. The active direction of curing energy 18 from a curing energy source 16 controlled by the controller 20 may rely, at least in part, on mathematical calculations that predict thermal characteristics of a part 14 as it is being additively manufactured. For example, the predicted thermal characteristics may be based on one or more of properties associated with a feedstock material used to create a part 14, a timing of creation of discrete sections of a part 14, environmental conditions within the build volume 12, thermal data (optionally incomplete) acquired by an optional thermal sensor 44, and other process parameters such as a temperature associated with a nozzle 54, and the active direction of curing energy 18 may be based on such predictions to direct one or more of the location of curing energy, the intensity of curing energy, the duration of curing energy, etc.

Additionally or alternatively, such systems 10 may further be configured to direct heat to discrete sections of a part 14 as it is being additively manufactured, such as to impart desired physical properties to the part 14. Examples of compatible heat-based systems that may be combined with systems 10 herein are disclosed in U.S. patent application Ser. No. 15/346,537, the disclosure of which is incorporated herein by reference.

Additionally or alternative and as schematically and optionally illustrated in FIG. 1, some systems 10 further comprise a cooling system 48 that is positioned relative to the build volume 12 and that is configured to actively withdraw heat from discrete sections of a part 14 as it is being additively manufactured to impart desired cure properties to the discrete sections and/or to follow predetermined cure profiles of the discrete sections. In such systems 10, the controller 20 is operatively coupled to the cooling system 48 and is configured to direct withdrawal of heat from discrete sections of a part 14 as it is being additively manufactured.

As an example, and as schematically and optionally represented in FIG. 1, the optional cooling system 48 may comprise a supply 50 of pressurized fluid (e.g., gas or liquid), with the cooling system 48 being configured to actively deliver a stream, or jet, 52 of the pressurized fluid to actively withdraw heat from discrete sections of a part 14 as it is being additively manufactured. Examples of suitable fluids include (but are not limited to) refrigerated fluids and cryogenic fluids. Additionally or alternatively, an evaporative cooling fluid stream or mist may be directed to discrete regions of a part 14 by a cooling system 48.

Additionally or alternatively, an optional cooling system 48 may be configured to selectively contact discrete regions of a part 14 to withdraw heat therefrom. In some such examples, the cooling system 48 comprises a probe and/or a clamp, and may be described as a heat sink and/or may include heat sink structures, such as cooling fins and the like.

Additionally or alternatively, in some systems 10, a cooling system 48 may comprise an optional support bed 38 and/or an optional support bed 38 may comprise a cooling system 48. For example, in some such systems 10, the support bed 38 may be configured to actively withdraw heat from a lower surface of a part 14 as it is being additively manufactured. As an illustrative, non-exclusive example, a support bed 38 may comprise cooling coils or lines that carry a fluid flow and that may be selectively controlled by controller 20.

As mentioned, systems 10 may utilize and/or be configured for use with any suitable type of additive manufacturing techniques. In FIG. 1, for illustrative purposes only, system 10 is schematically illustrated as further comprising a nozzle 54 positioned relative to the build volume 12 and that is configured to deliver a material from a feedstock source 56 to the build volume 12 to additively manufacture a part 14. Such a system 10 may be described as comprising a deposition system 58 that is configured to deliver a feedstock material to the build volume 12 to additively manufacture a part 14. Some such systems 10 further comprise at least a second curing energy source 16 that is associated with the nozzle 54, as schematically indicated at 62 in FIG. 1 and referred to herein as a curing energy source 62. When present, curing energy source 62 may direct or otherwise impart curing energy directly to material as it is being dispensed from the nozzle 54. In some such systems 10, such curing energy may only partially cure the material, such that as a part 14 is being additively manufactured, the material is deposited in a partially cured state, with other curing energy sources 16 then being used to direct curing energy 18 to discrete sections of the part 14 to impart desired cure properties and/or to follow predetermined cure profiles.

Some systems 10 further comprise an environmental enclosure 60 with at least the build volume 12 being positioned within the environmental enclosure 60. Other components such as the controller 20 may be positioned external of, or at least partially external of, the environmental enclosure 60, when present. As illustrative, non-exclusive examples, environmental enclosures 60 may include one or more of (but are not limited to) autoclaves, ovens, pressure chambers, vacuum chambers, inert gas chambers, environmental bags, tents, or boxes, and light exposure chambers.

Controller 20 may be any suitable device or devices (i.e., machines) that are configured and/or programmed to perform the functions of the controller 20 discussed herein. For example, the controller 20 may include one or more of an electronic controller, a dedicated controller, a special-purpose controller, a personal computer, a special-purpose computer, a display device, a logic device, a memory device, and/or a memory device having non-transitory computer readable storage media suitable for storing computer-executable instructions for implementing aspects of systems 10 and/or methods disclosed herein.

Additionally or alternatively, the controller 20 may include, and/or be configured to read, non-transitory computer readable storage media, or memory, suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

In FIG. 1, communication between controller 20 and various component parts of system 10 is schematically represented by lightning bolts. Such communication may be wired and/or wireless in nature.

Figure 3:
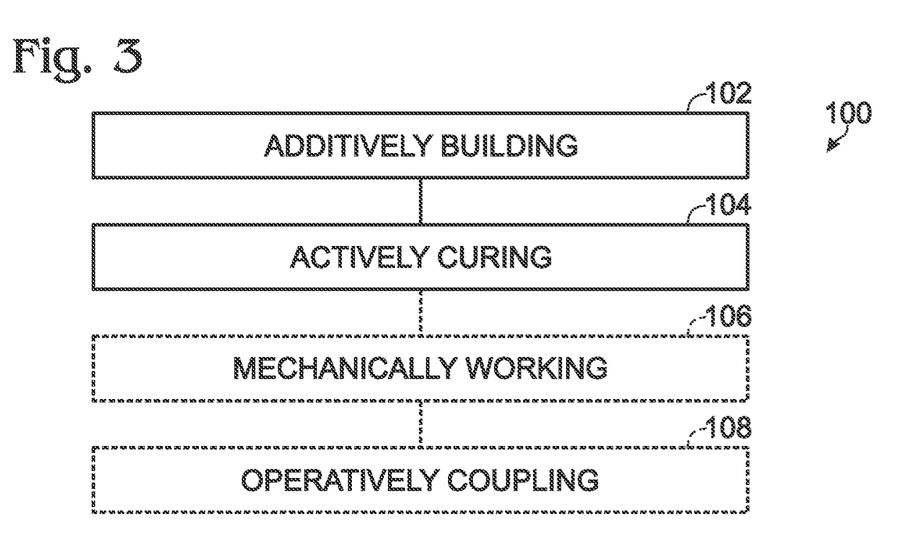
FIG. 3 is a flowchart schematically representing methods for cure control of additive manufacturing.

Turning now to FIG. 3, methods 100 for additively manufacturing a part are schematically represented. Methods 100 may (but are not required to) be implemented, or performed, by a system 10. Methods 100 comprise at least the steps of additively building 102 a part from a feedstock material and actively curing 104 discrete sections of the part as it is being additively built to impart desired cure properties and/or to follow predetermined cure profiles for the part. By actively curing discrete sections of a part as it is being additively built, the discrete sections may be cured at different and desired rates, as opposed to, for example, curing an entire part within an oven or autoclave, in which the entirety of the part is subjected to the same heat and pressure.

The actively curing 104 may be performed for a variety of reasons and may result in a variety of cure properties, including physical characteristics, of a part as it is being additively built. In some examples, the actively curing 104 may comprise curing discrete sections of the part to different levels of cure or with different rates of cure. For example, the actively curing 104 may comprise curing a first discrete section to a first level of cure and curing a second discrete section to a second level of cure, with the first level of cure being greater than the second level of cure. As illustrative, non-exclusive examples, the level of cure may be controlled by controlling one or more of the intensity of curing energy, the duration of exposure of the curing energy, and/or the periodicity or frequency of the curing energy directed to a discrete section of a part. Additionally or alternatively, if different discrete sections of a part are constructed of distinct materials, then different durations and/or intensities of curing energy may be required to impart desired cure properties to such discrete sections. Additionally or alternatively, the actively curing 104 may comprise curing a first discrete section according to a first cure profile and curing a second discrete section according to a second cure profile, with the second cure profile differing from the first cure profile.

In some examples, the actively curing 104 results in a select discrete section of a part 14 being configured for subsequent work on the select discrete section. In such examples, methods 100 may thus further comprise subsequent to the actively curing 104, mechanically working 106 on the select discrete section, as schematically and optionally indicated in FIG. 3. In some such examples, the mechanically working 106 comprises imbedding a distinct component in the part. For example, the distinct component may be one or more of a sensor, an electronic device, an actuator, a fastener, wiring, circuitry, tubing, fiber optics, a mechanical linkage, and a sub-component. Additionally or alternatively, the mechanically working 106 may comprise removing material from the part, such as preceding the imbedding of a distinct component.

In some examples, methods 100 further comprise subsequent to the actively curing 104, operatively coupling 108 a distinct component to the select discrete section of the part. In some such examples, the operatively coupling 108 comprises curing together the distinct component and the select discrete section of the part. In some examples, the subsequent curing together may be a distinct curing step, such as performed by more traditional curing in an autoclave or oven. In other examples, the subsequent curing may be performed in conjunction with the actively curing 104 of a method 100. That is, the actively curing 104 may be repeated in connection with the operatively coupling and curing together of a distinct component to the select discrete section of the part 14.

Some methods further comprise actively cooling discrete sections of a part as it is being additively built to facilitate the actively curing 104. For example, in some applications, it may be desirable to retard curing to result in desired cure properties and/or to follow predetermined cure profiles. As an illustrative, non-exclusive example, when an exotherming resin is used to additively build a part, actively cooling may be required to result in desired cure properties and/or to follow predetermined cure profiles of distinct sections of a part.

In some examples, a method 100 is performed within an environmental enclosure, such as an environmental enclosure that comprises one or more of an autoclave, an oven, a pressure chamber, a vacuum chamber, inert gas chambers, environmental bags, tents, or boxes, and light exposure chambers.

Systems 10 and methods 100 may further include, have, or otherwise be associated with, any other various components, aspects, configurations, characteristics, properties, steps, etc. for additively manufacturing parts. Illustrative, non-exclusive examples of such various optional components, aspects, configurations, characteristics, properties, steps, etc. are disclosed in U.S. patent application Ser. Nos. 14/841,423; 14/841,470; 14/920,748; 14/931,573; 14/995,507; 15/063,400; 15/345,189; 15/346,537; and Ser. No. 15/356,420, the disclosures of which are incorporated herein by reference.

Illustrative, non-exclusive examples of inventive subject matter according to the present disclosure are described in the following enumerated paragraphs:

A. A system for cure control of additive manufacturing, the system comprising:

a build volume within which a part is additively manufactured;

a curing energy source positioned relative to the build volume and configured to actively deliver curing energy to discrete sections of the part as the part is being additively manufactured; and a controller operatively coupled to the curing energy source and programmed to direct delivery of curing energy from the curing energy source to discrete sections of the part as the part is being additively manufactured (i) to impart desired cure properties to the discrete sections and/or (ii) according to predetermined cure profiles for the discrete sections.

A1. The system of paragraph A, wherein the curing energy source is configured to be able to deliver curing energy to any exposed portion of the part as the part is being additively manufactured.

A2. The system of any of paragraphs A-A1, further comprising:
a curing energy source drive assembly configured to actively move the curing energy source in three dimensions relative to the build volume.

A3. The system of any of paragraphs A-A2, wherein the curing energy source comprises a laser, optionally an ultraviolet laser.

A3.1. The system of paragraph A3, wherein the curing energy source further comprises a mirror-positioning system configured to actively direct a laser beam from the laser to discrete sections of the part as the part is being additively manufactured.

A4. The system of any of paragraphs A-A3.1, wherein the curing energy source comprises an electron beam source.

A4.1. The system of paragraph A4, wherein the curing energy source further comprises a magnetic steering system configured to actively direct an electron beam from the electron beam source to discrete sections of the part as the part is being additively manufactured.

A5. The system of any of paragraphs A-A4.1, wherein the curing energy source comprises a lamp, optionally an ultraviolet lamp.

A5.1. The system of paragraph A5, wherein the curing energy source further comprises a projector associated with the lamp, wherein the projector is configured to direct light from the lamp to discrete sections of the part as the part is being additively manufactured.

A5.2. The system of paragraph A5, wherein the curing energy source further comprises a shuttering system associated with the lamp, wherein the shuttering system is configured to selectively direct light from the lamp to discrete sections of the part as the part is being additively manufactured.

A6. The system of any of paragraphs A-A5.2, further comprising:
a support bed positioned relative to the build volume and configured to support the part as the part is being additively manufactured.

A6.1. The system of paragraph A6, wherein the curing energy source comprises the support bed, and wherein the support bed is configured to actively deliver curing energy to discrete sections of a lower surface of the part as the part is being additively manufactured.

A6.2. The system of any of paragraphs A6-A6.1, wherein the support bed is transparent to the curing energy, and wherein the curing energy source is configured to actively deliver curing energy through the support bed to discrete sections of a lower surface of the part as the part is being additively manufactured.

A6.3. The system of any of paragraphs A6-A6.2, wherein the support bed is configured to actively mask a lower surface of the part as the part is being additively manufactured to actively direct curing energy to discrete sections of the lower surface of the part as the part is being additively manufactured.

A7. The system of any of paragraphs A-A6.3, wherein the curing energy source comprises two or more curing energy sources.

A8. The system of any of paragraphs A-A7, further comprising:
a deposition system positioned relative to the build volume, wherein the deposition system is configured to deliver a feedstock material to the build volume to additively manufacture the part.

A9. The system of any of paragraphs A-A8, further comprising:
an environmental enclosure, wherein at least the build volume is positioned within the environmental enclosure, optionally wherein the environmental enclosure comprises one or more of an autoclave, an oven, a pressure chamber, a vacuum chamber, inert gas chambers, environmental bags, tents, or boxes, and light exposure chambers.

A10. The system of any of paragraphs A-A9, wherein the system is configured to perform the method of any of paragraphs B-B5.

A11. The use of the system of any of paragraphs A-A10 to additively manufacture the part.

A12. The use of the system of any of paragraphs A-A10 to additively manufacture the part with desired cure properties and/or according to predetermined cure profiles.

A13. The use of the system of any of paragraphs A-A10 to additively manufacture the part with distinct sections of the part having different levels of cure.

A14. The use of the system of any of paragraphs A-A10 to facilitate subsequent work on the part.

B. A method of additively manufacturing a part, the method comprising:
additively building a part from a feedstock material; and
actively curing discrete sections of the part as the part is being additively built (i) to impart desired cure properties to the part and/or (ii) according to predetermined cure profiles for discrete sections of the part.

B1. The method of paragraph B, wherein the actively curing comprises curing discrete sections of the part (i) to different levels of cure and/or (ii) according to distinct predetermined cure profiles.

B2. The method of any of paragraphs B-B1, wherein the actively curing comprises curing a first discrete section to a first level of cure and curing a second discrete section to a second level of cure, wherein the first level of cure is greater than the second level of cure.

B3. The method of any of paragraphs B-B2, wherein the actively curing comprises curing a first discrete section according to a first cure profile and curing a second discrete section according to a second cure profile, wherein the second cure profile differs from the first cure profile.

B4. The method of any of paragraphs B-B3, wherein the actively curing results in a select discrete section of the part being configured for subsequent work on the select discrete section.

B4.1. The method of paragraph B4, further comprising:
subsequent to the actively curing, mechanically working on the select discrete section.

B4.1.1. The method of paragraph B4.1, wherein the mechanically working comprises imbedding a distinct component in the part, optionally wherein the distinct component is one or more of a sensor, an electronic device, an actuator, a fastener, wiring, circuitry, tubing, fiber optics, a mechanical linkage, and a sub-component.

B4.2. The method of any of paragraphs B4-B4.1, further comprising:
subsequent to the actively curing, operatively coupling a distinct component to the select discrete section of the part.

B4.2.1. The method of paragraph B4.2, wherein the operatively coupling comprises curing together the distinct component and the select discrete section of the part.

B5. The method of any of paragraphs B-B4.2.1, wherein the method is performed within an environmental enclosure, optionally wherein the environmental enclosure comprises one or more of an autoclave, an oven, a pressure chamber, a vacuum chamber, an inert gas chamber, an environmental bag, tent, or box, and a light exposure chamber.

B6. The method of any of paragraphs B-B4, wherein the method is performed by the system of any of paragraphs A-A10.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of systems and steps of methods disclosed herein are not required to all systems and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

The invention claimed is:

1. A method of additively manufacturing a part, the method comprising:
   additively building the part from a curable feedstock material by delivering the curable feedstock material to a build volume via a nozzle of a deposition system;
   actively curing discrete sections of the part as the curable feedstock material is being delivered to the build volume via the nozzle to additively build the part according to predetermined cure profiles for the discrete sections of the part, wherein the actively curing is computer controlled, wherein the actively curing comprises curing a select discrete section of the part less than the rest of the part, such that the select discrete section of the part is configured for subsequent work on the select discrete section; and
   subsequent to the actively curing, operatively coupling a distinct component to the select discrete section of the part.

2. The method of claim 1, wherein the actively curing comprises curing discrete sections of the part to different levels of cure.

3. The method of claim 1, wherein the actively curing comprises curing a first discrete section to a first level of cure and curing a second discrete section to a second level of cure, wherein the first level of cure is greater than the second level of cure.

4. The method of claim 1, wherein the actively curing comprises curing a first discrete section according to a first cure profile and curing a second discrete section according to a second cure profile, wherein the second cure profile differs from the first cure profile.

5. The method of claim 1, further comprising:
   subsequent to the actively curing, mechanically working on the select discrete section.

6. The method of claim 1, wherein the operatively coupling comprises curing together the distinct component and the select discrete section of the part.

7. The method of claim 1, wherein the method is performed within an environmental enclosure, wherein the environmental enclosure comprises one or more of an autoclave, an oven, a pressure chamber, a vacuum chamber, an inert gas chamber, an environmental bag, tent, or box, and a light exposure chamber.

8. The method of claim 1, wherein the actively curing comprises delivering curing energy by a curing energy source that is configured to be able to deliver the curing energy to any exposed portion of the part as the part is being additively built.

9. The method of claim 1, wherein the additively building the part comprises additively building the part within a build volume, wherein the actively curing comprises actively moving a curing energy source in three dimensions relative to the build volume.

10. The method of claim 1, wherein the actively curing comprises directing a laser beam to the discrete sections of the part.

11. The method of claim 1, wherein the actively curing comprises directing a laser beam to the discrete sections of the part with a mirror-positioning system.

12. The method of claim 1, wherein the actively curing comprises directing an electron beam to the discrete sections of the part.

13. The method of claim 1, wherein the actively curing comprises directing an electron beam to the discrete sections of the part with a magnetic steering system.

14. The method of claim 1, wherein the actively curing comprises directing light from a lamp to the discrete sections of the part with a projector.

15. The method of claim 1, wherein the actively curing comprises selectively directing light from a lamp to the discrete sections of the part with a shuttering system.

16. The method of claim 8, wherein the actively curing comprises delivering curing energy to discrete sections of a lower surface of the part via a support bed that supports the part as the part is being additively built.

17. The method of claim 1, wherein the actively curing comprises actively directing curing energy to discrete sections of a lower surface of the part supported by a support bed by having the support bed actively mask the lower surface.

18. A method of additively manufacturing a part, the method comprising:
   additively building the part from a curable feedstock material by delivering the curable feedstock material to a build volume via a nozzle of a deposition system;
   actively curing discrete sections of the part as the curable feedstock material is being delivered to the build volume via the nozzle to additively build the part according to predetermined cure profiles for the discrete sections of the part, wherein the actively curing is computer controlled, and wherein the actively curing comprises curing a select discrete section of the part less than a remainder of the part and facilitates removal of the select discrete section from the part; and subsequent to the actively curing, replacing the select discrete section with a distinct component, wherein the replacing the select discrete section with the distinct component comprises removing the select discrete section and embedding the distinct component in the part, wherein the distinct component is one or more of a sensor, an electronic device, an actuator, a fastener, wiring, circuitry, tubing, fiber optics, a mechanical linkage, or a sub-component.

19. The method of claim 18, wherein the actively curing comprises curing discrete sections of the part to different levels of cure.

20. The method of claim 18, wherein the actively curing comprises curing a first discrete section to a first level of cure and curing a second discrete section to a second level of cure, wherein the first level of cure is greater than the second level of cure.

21. The method of claim 18, wherein the actively curing comprises curing a first discrete section according to a first cure profile and curing a second discrete section according to a second cure profile, wherein the second cure profile differs from the first cure profile.

\* \* \* \* \*